United States Patent

Sasaki

[11] Patent Number: 5,478,155
[45] Date of Patent: Dec. 26, 1995

[54] PRINTING APPARATUS AND METHOD OPERATIVE TO PRINT AND/OR STORE PRINT DATA IN NON-VOLATILE MEMORY

[75] Inventor: Ichiro Sasaki, Aichi, Japan

[73] Assignee: Brother Kogyo Kabushiki Kaisha, Nagoya, Japan

[21] Appl. No.: 202,021

[22] Filed: Feb. 25, 1994

[30] Foreign Application Priority Data

Mar. 29, 1993 [JP] Japan ................................ 5-093730

[51] Int. Cl.⁶ .............................. G06F 3/00; G06F 7/00
[52] U.S. Cl. ............................... 400/76; 395/115; 400/63
[58] Field of Search ............................... 400/61, 62, 63, 400/70, 71, 76; 395/111, 114, 115, 116, 135, 146

[56] References Cited

U.S. PATENT DOCUMENTS 4,639,151  1/1987  Ueno et al. ............................ 400/61
4,825,405  4/1989  Makino ................................ 400/61
5,324,120  6/1994  Kataoka .............................. 400/63

FOREIGN PATENT DOCUMENTS 61-46632   3/1986   Japan ................................ 400/61
1-263064  10/1989   Japan ................................ 400/61
141466     6/1991   Japan ................................ 400/61
144773     5/1992   Japan ............................... 400/121

Primary Examiner—Edgar S. Burr
Assistant Examiner—Steven S. Kelley
Attorney, Agent, or Firm—Oliff & Berridge

[57] ABSTRACT

A printer, which prints text or image data sent from external data sources, allows the operator to select through a key operation on its operation panel whether the print data is to be printed and/or stored in the non-volatile memory of the printer. The operator can store frequently used text and image data provided by the external data sources in the non-volatile memory and can retrieve and print intended print data independently of the external data sources.

13 Claims, 8 Drawing Sheets

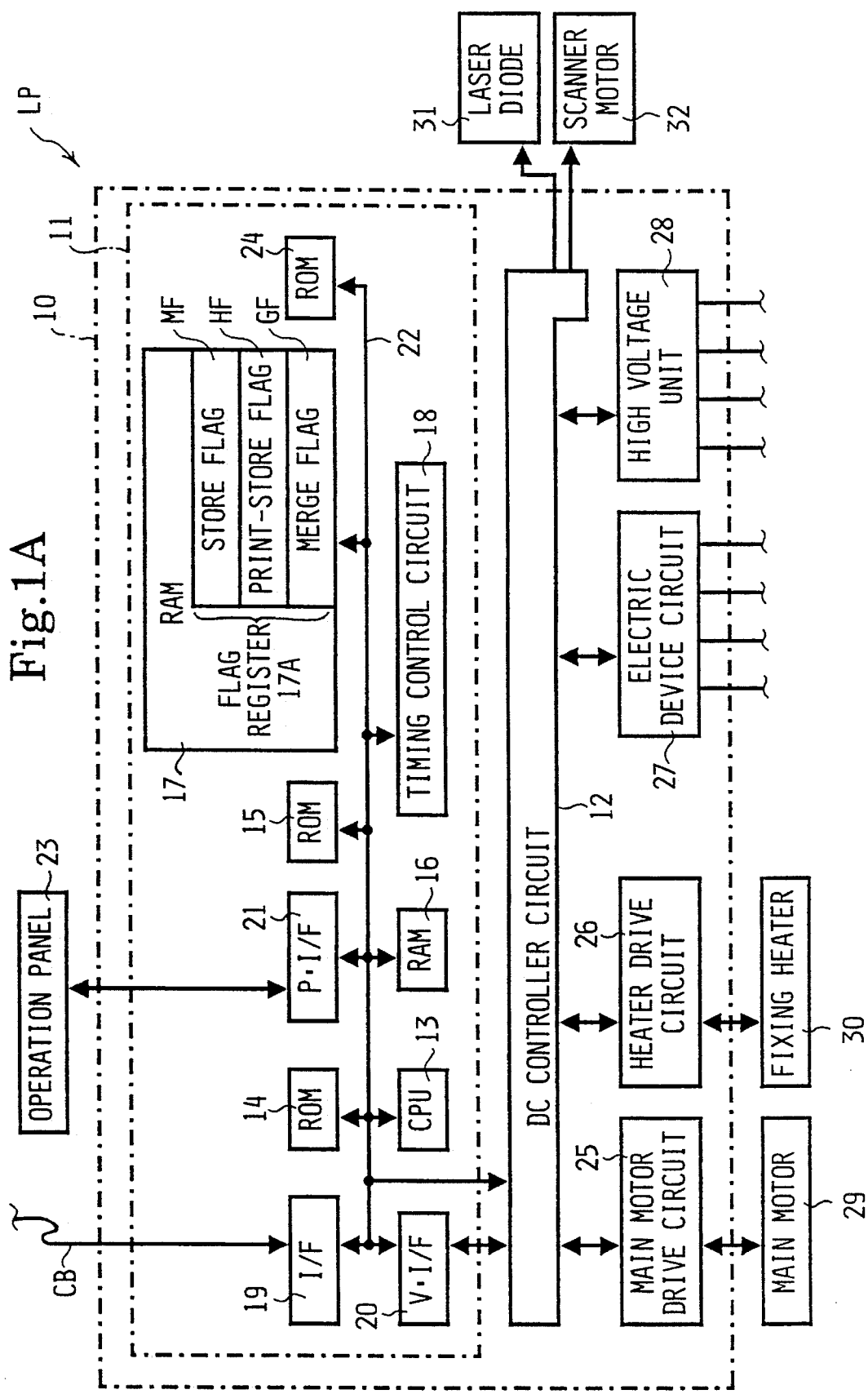

PRINTING APPARATUS AND METHOD OPERATIVE TO PRINT AND/OR STORE PRINT DATA IN NON-VOLATILE MEMORY

BACKGROUND OF THE INVENTION

1. Field of the Invention

The present invention relates to a printing apparatus that prints data sent from an external apparatus and, more particularly, to a printing apparatus operative to allow an operator to choose whether received print data is to be printed and/or stored in a non-volatile memory.

2. Description of the Related Art

In a recent advanced office automation system, personal computers, workstations and high-speed printers such as laser printers and dot-matrix printers are organized through a cable network so that print data stored in personal computers are transferred to the printers arbitrarily for printing.

Many kinds of printers equipped with storage devices for storing print data have been proposed. For example, Japanese Patent Laid-open No. Hei 1-263064 discloses a printer that includes a floppy disk memory, a print mechanism and a controller and operates to receive print data from external devices, store the print data on the floppy disk, and thereafter retrieve and print the data so that the external devices can operate more efficiently. Some of these printers are equipped with a buffer memory for holding received print data temporarily instead of in the floppy disk memory.

However, the printer disclosed in the above-mentioned Japanese Patent Laid-open No. Hei 1-263064 is designed to store all received print data at every data reception from an external device by halting the printing operation during the storing operation, resulting in an increased print time and degraded workability of the printer.

SUMMARY OF THE INVENTION

An object of the present invention is to provide a printing apparatus capable of improving the total work-ability and operability of the printer and external devices through the selective operation based on the quantity of received print data and the necessity of storing the print data.

The printer according to the invention includes an interface circuit for receiving print data from external devices, a printer for printing the received print data in the form of characters or an image on a print medium, a writable non-volatile memory for storing the received print data, a processor for implementing a printing process for loading the print data to the printer and a storing process for storing the print data in the non-volatile memory, and a data readout device for reading the stored print data out of the non-volatile memory and loading the data into the printer.

In the data store process, print data received through the interface circuit is stored in the non-volatile memory, and in the print process, print data is loaded into the printer. The data readout device reads print data out of the non-volatile memory and loads the data into the printer. The printer prints print data received through the interface circuit or read out of the non-volatile memory in the form of characters or an image.

The operator can choose at each print data reception from an external device whether the print data is to be printed and/or stored in the non-volatile memory depending on the quantity of print data, the urgency of having a print of the data and the necessity of storing the print data. The operator can store frequently used print data in the non-volatile memory of the printer and retrieve and print the stored print data repeatedly when necessary, and consequently, the total workability and operability of the printer and external devices can be improved.

By adopting a flash ROM that can be erased electrically for the non-volatile memory, a large quantity of data can be stored in the printer at a low cost.

BRIEF DESCRIPTION OF THE DRAWINGS

FIGS. 1A and 1B show a block diagram of a control system of a laser printer in a preferred embodiment according to the present invention;

DETAILED DESCRIPTION OF PREFERRED EMBODIMENTS

Figure 1B:
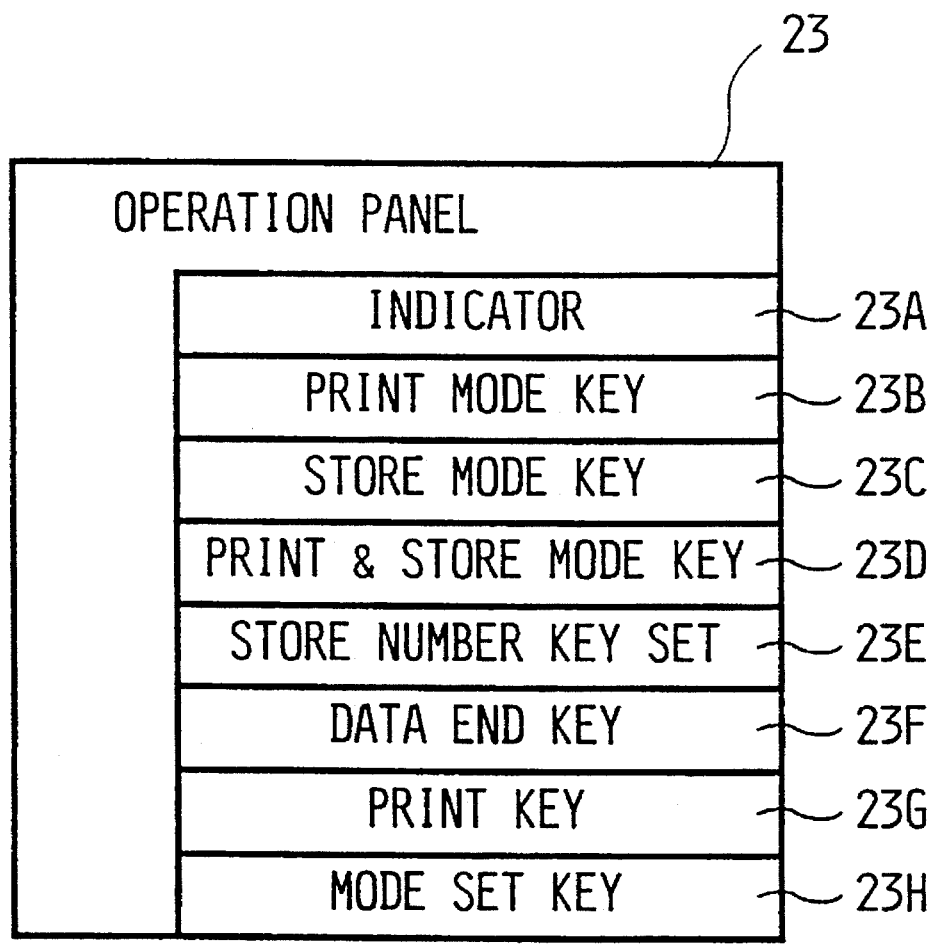

An embodiment of this invention will be described with reference to the drawings. This embodiment will be described in conjunction with a laser printer that receives print data from external devices such as personal computers and prints the data. The control system of this laser printer, which is identical to that of usual laser printers, will be explained with reference to the block diagram of FIG. 1.

The laser printer has a control unit 10 that includes a video controller 11 and a DC controller circuit 12. Included in the video controller 11 are a CPU 13, a ROM 14, which stores a print control program and other various control programs, a ROM 15, which stores outline data that defines profiles of characters, a RAM 16 used for a data buffer and a data register for holding a certain amount of print data sent from an external device, a ROM 24, which is a writable non-volatile memory for storing received print data so that the data can be printed repeatedly, a RAM 17, which is a work memory used for a print buffer for holding dot pattern data produced from data in the data register or non-volatile memory, format data register for holding format data, and flag register for holding data of flags MF, HF and GF, a timing control circuit 18 which generates timing signals for writing and reading data in the RAM 16, a Centronix-standard interface circuit (I/F) 19 for receiving print data from external devices, a video interface circuit (V.I/F) 20, which has two 4K-byte scanning buffers formed of dual-port RAM (FIFO registers) and delivers dot pattern data derived from print data to the DC controller circuit 12 sequentially, and a panel interface circuit (P.I/F) 21 for receiving signals from an operation panel 23. These functional components are connected with each other through a signal bus 22.

The non-volatile memory (ROM 24) is an EEPROM that can be erased electrically, and it is generally called a "flash ROM."

Control programs stored in the ROM 14 include a print control language interpreter for processing print data sent from external devices, which however does not concern the present invention directly and the details thereof will not be explained here.

Provided on the operation panel 23 is a PRINT MODE key 23B used to set the operational mode in which received print data is printed without being saved in the ROM 24, a STORE MODE key 23C used to set the mode in which received print data is stored in the non-volatile memory 24 without being printed, a PRINT & STORE mode key 23D used to set the mode in which received print data is printed and stored in the non-volatile memory 24 concurrently, a STORE NUMBER key set (numeric key set) 23E used to specify the store-number for print data to be stored in the non-volatile memory 24, a DATA END key 23F used to declare the end of data reception, a PRINT key 23G used to specify the printing of data stored in the non-volatile memory 24, and a MODE SET key 23H used to select various operational modes. The operation panel 23 further includes a mode and store-number indicator 23A.

The DC controller circuit 12 is connected inside the control unit 10 with a main motor drive circuit 25 that drives a main motor 29, a heater drive circuit 26 that drives a fixing heater 30, an electric device circuit 27, and a high voltage unit 28 that supplies a high voltage. The DC controller circuit 12 is further connected externally with a laser diode 31, which is a light emitting element of a semiconductor laser source, and a scanner motor 32 that rotates a hexahedral mirror.

Next, the print control routine implemented by the video controller 11 in the laser printer will be explained on the flowcharts of FIG. 2 through FIG. 7, in which process steps are indicated by Si (i=10, 11, 12, . . . ).

The laser printer is turned on, and the print control commences. At the beginning, the control system is initialized, and the RAMs 16 and 17 are cleared (S10). The system determines whether any key on the operation panel 23 is operated (S11). If any key operation is not detected (S11: no), the system tests whether print data is being received (S23). If data reception is not detected (S23: no), the control sequence returns to S11.

On detecting the operation of the STORE MODE key (S11, S12: yes), the storing flag MF is set to establish the store mode (S13), and the control sequence returns to S11. On detecting the operation of the PRINT MODE key (S11: yes, S12: no, S14: yes), the store flag MF is reset to cancel the store mode, the print mode is established (S15), and the control sequence returns to S11. On detecting the operation of the DELETE key (S11: yes, S12, S14: no, S16: yes), the process for deleting print data with the store-number specified by the STORE NUMBER key set among print data stored in the non-volatile memory 24 is carried out, and the control sequence returns to S11. On detecting the operation of the PRINT & STORE MODE key (S11: yes, S12, S14, S16: no, S18: yes), the print-store flag HF is set (S19), and the control sequence returns to S11.

When the laser printer receives print data from an external device (S11: no, S23: yes), with the store flag MF being set to zero (S24: no), the usual print process (FIG. 3) takes place (S26). It is assumed that the external device sends format data and text data (character data).

Initially, the print data fetching process (FIG. 4) is carried out (S31). If the data buffer in RAM 16 contains data (S50: yes), each byte of data is fetched sequentially (S51), and the control sequence goes out of this routine and returns to S32 of the print data processing routine.

In case the fetched data is not the command that specifies the printing of print data stored in the non-volatile memory 24 (S32: no), but it is the merge command (S35: yes), and at the same time the print-store flag HF is found reset (S36: no), the merge flag GF is set (S37). Otherwise, if the the print-store flag HF is found set (S36: yes), the control sequence returns to S31 to carry out the concurrent print-store operation.

If the fetched data is not the merge command (S35: no) and at the same time the print-store flag HF is found set (S38: yes), the fetched data is stored in the non-volatile memory 24 (S39). Otherwise if the print-store flag HF is found reset (S38: no), the control sequence proceeds to S40.

In case the fetched data is print format data (S40: yes), it is loaded into the format register in the RAM 17 (S41), and the control sequence returns to S31. If the fetched data is neither format data nor the form feed command (FF command) (S40, S42: no), i.e., it is character data, the data is loaded into the data register in RAM 16, with character width data indicative of the character size and font specified by the format data being appended to it (S43), and the control sequence returns to S31.

When the fetched data is the form feed command or when the command is generated in response to the end of data loading for the amount of one page (S32, S35, S38, S40: no, S42: yes), the dot pattern data generating process (FIG. 5) takes place (S44).

Initially, character data in the data register is developed into dot pattern data based on the format data, and the resulting dot pattern data is loaded into the print buffer in RAM 17 (S60). When the merge flag GF is found set (S61: yes), dot pattern data is read out of the non-volatile memory 24 and merged into the dot pattern data in the print buffer (S62). The merge flag GF is reset (S63), the merged dot pattern data is delivered to the DC controller circuit 12 by way of the video interface circuit 20, and it is printed on the print paper (S64). The data register is cleared (S65), and the control sequence returns to S31 of the print data processing routine. If the merge flag GF is found reset at the development of print data (S61: no), the control sequence proceeds to S64.

In step S31, the print data fetching process takes place. In the absence of data in the data buffer at the end of data reception (S50: no), steps S50 and S52 are repeated until the operation of the DATA END key is detected. On detecting the operation of the DATA END key (S52: yes), if the print-store flag HF is found set (S53: yes), it is reset (S54), and data with the store-number specified by the STORE NUMBER key set (identification data) is added to the top of the received print data (S55). The control sequence then returns to S11.

After the print process has commenced, when the fetched data is the stored data print command (S32: yes) and if the print-store flag HF is found set (S33: yes), the control sequence returns to S31 to carry out the concurrent print-store operation, or otherwise, if the print-store flag HF is found reset (S33: no), the stored data print process (FIG. 7) takes place (S34).

Initially, each byte of print data is read out of the non-volatile memory 24 sequentially (S81). In case the fetched data is format data (S82: yes), it is loaded into the format register in RAM 17 (S83), and the control sequence returns to S81. If the fetched data is neither format data nor the form feed command (S82, S84: no), i.e., it is character data, the data is loaded into the data register (S85), with the character width data indicative of the character size and font specified by the format data appended to it, and the control sequence returns to S81.

In case the fetched data is the form feed command (S82: no, S84: yes), character data in the data register is developed into dot pattern data based on the format data, and the resulting dot pattern data is loaded into the print buffer (S86). The dot pattern data is delivered to the DC controller circuit 12 by way of the video interface circuit 20, and it is printed on the print paper (S87). The data register is cleared (S88), and, if the non-volatile memory 24 contains print data that is not yet processed (S89: no), the control sequence returns to S81. Otherwise, if all print data in the non-volatile memory 24 are found processed (S89), the control sequence returns to S31.

On receiving print data from an external device (S11: no, S23: yes), if the store mode is found set (S24: yes), the data store process (FIG. 6) takes place (S25).

Initially, each byte of received print data is fetched sequentially (S70) and stored in the non-volatile memory 24 (S71). Unless the operation of the DATA END key is detected (S72: no), the control sequence returns to S70. Otherwise, if this key operation is detected following the data reception (S72: yes), data with the store-number specified by the STORE NUMBER key set (identification data) is added to the top of the received print data (S73). The control sequence then returns to S11.

Figure 2:
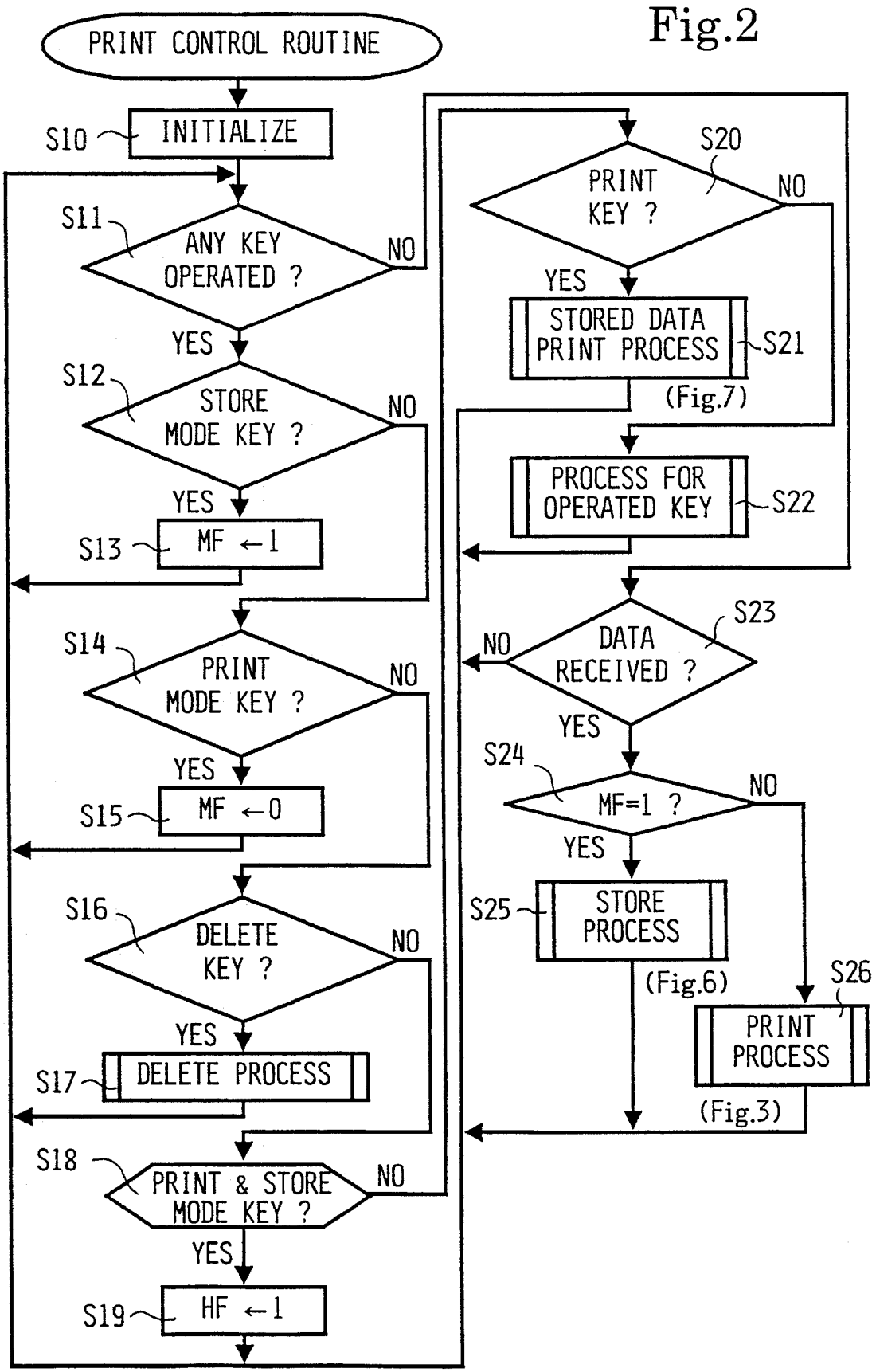
FIG. 2 is a flowchart explaining a print control routine of the printer.
Figure 3:
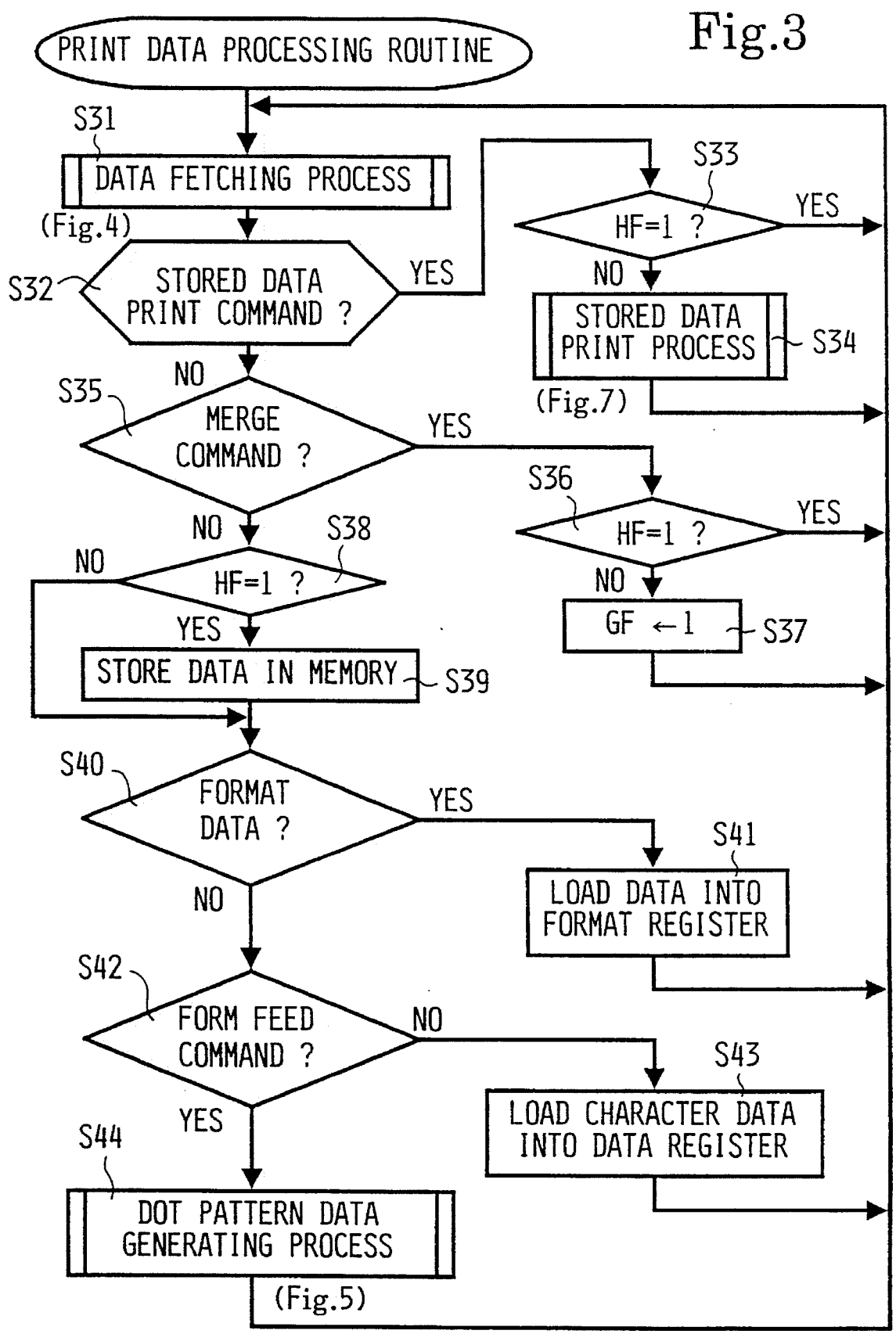
FIG. 3 is a flowchart explaining a print data processing routine of the printer.
Figure 4:
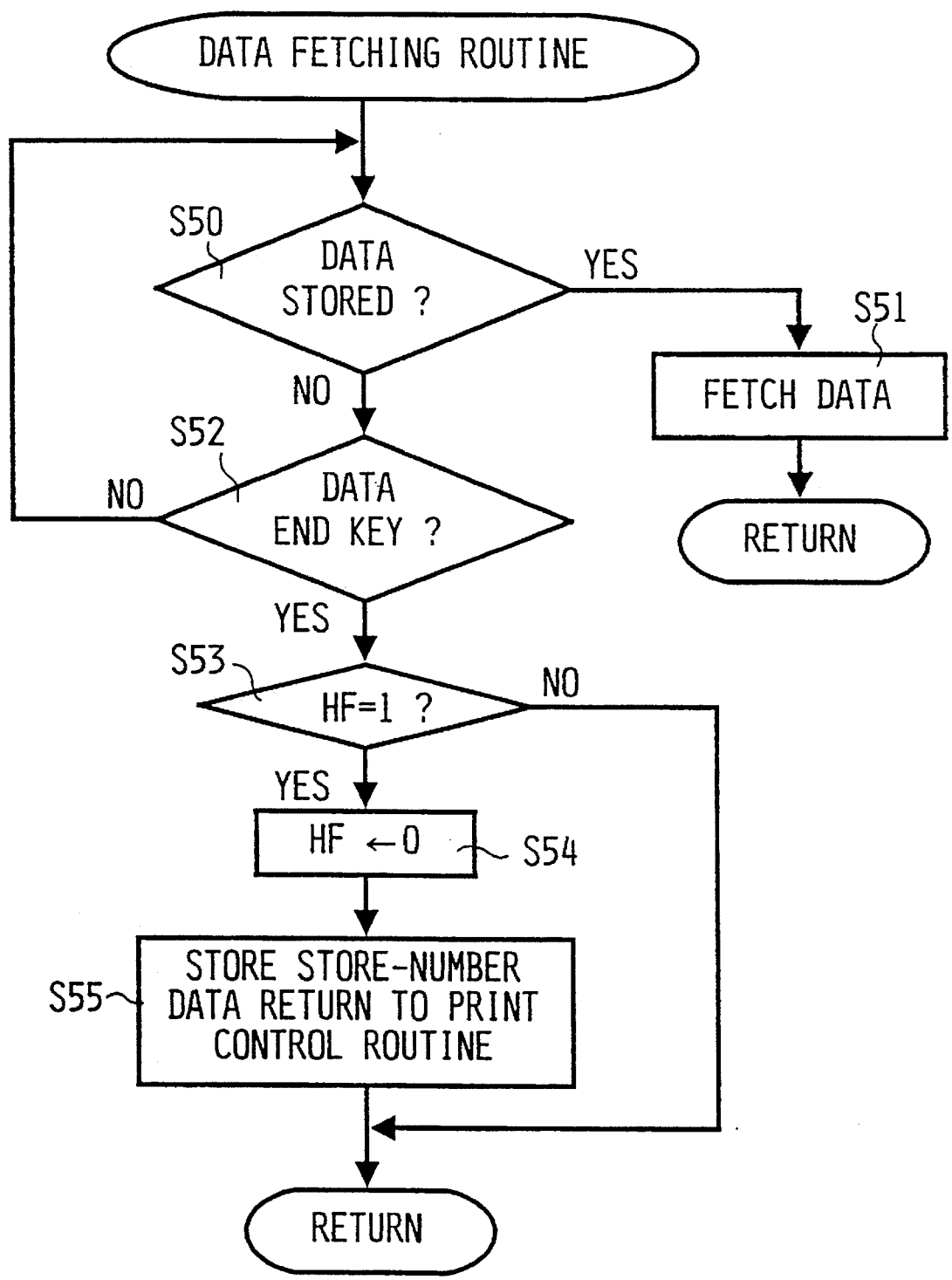
FIG. 4 is a flowchart explaining a print data fetching routine of the printer.
Figure 5:
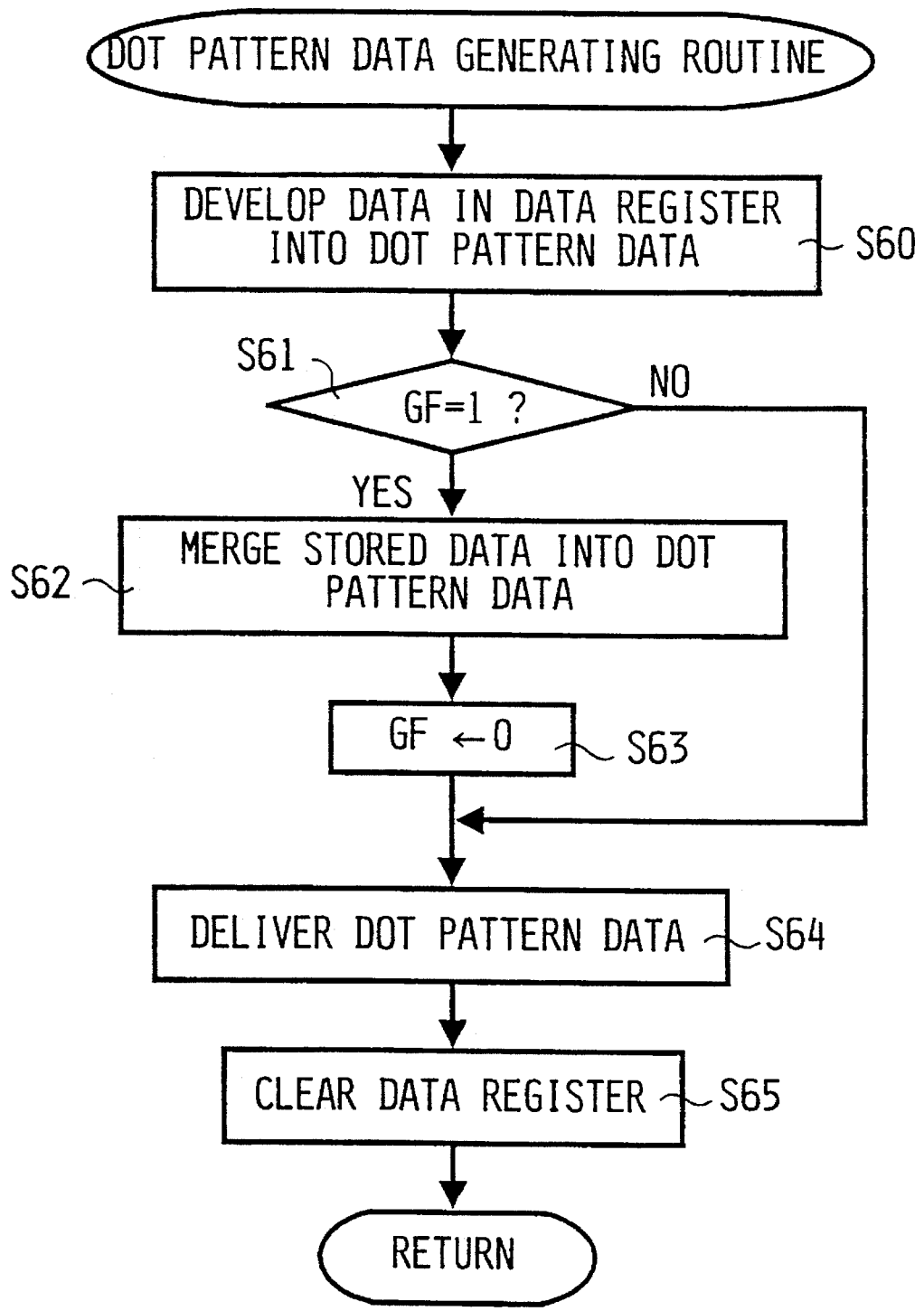
FIG. 5 is a flowchart explaining a dot-pattern data generating routine of the printer.
Figure 6:
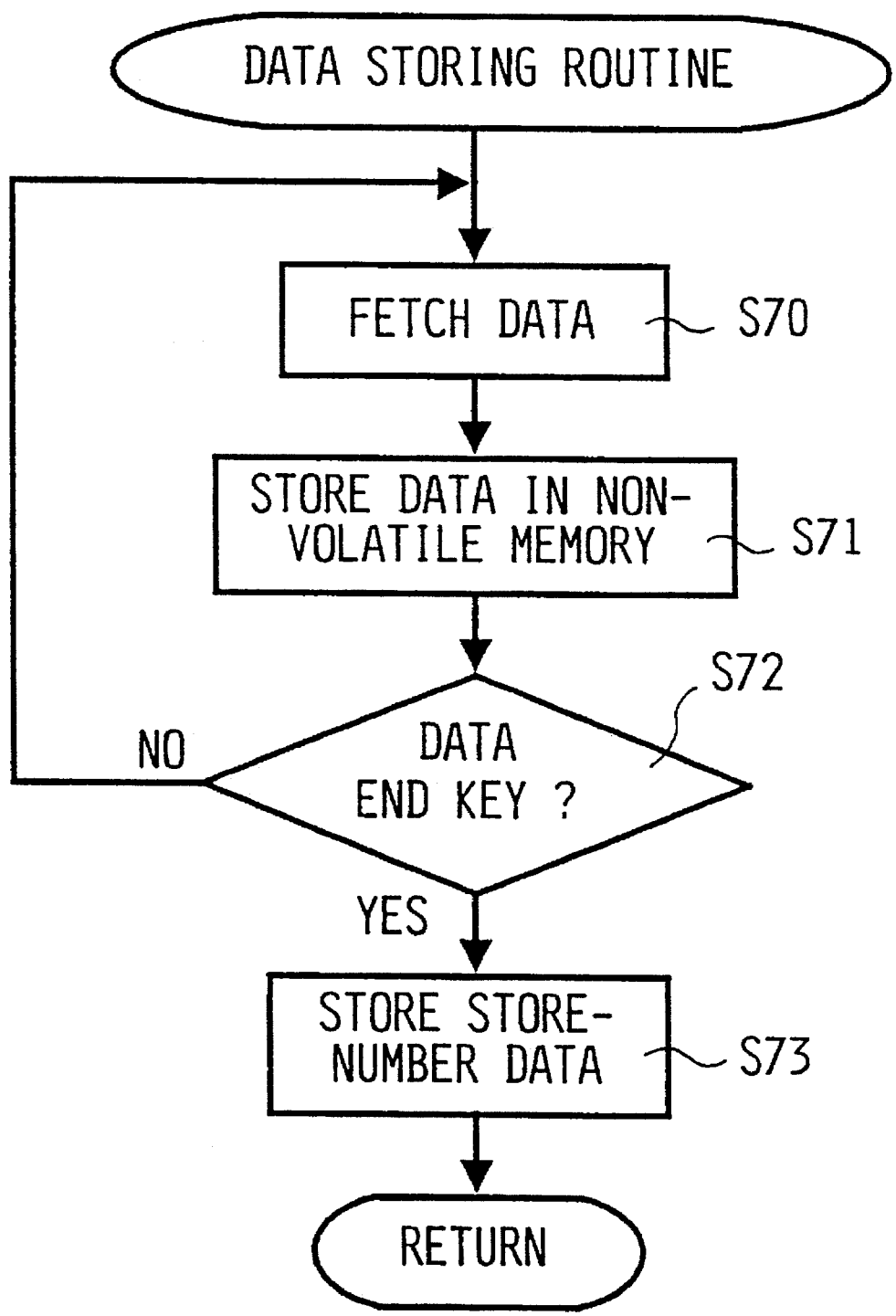
FIG. 6 is a flowchart explaining a print data storing routine of the printer.
Figure 7:
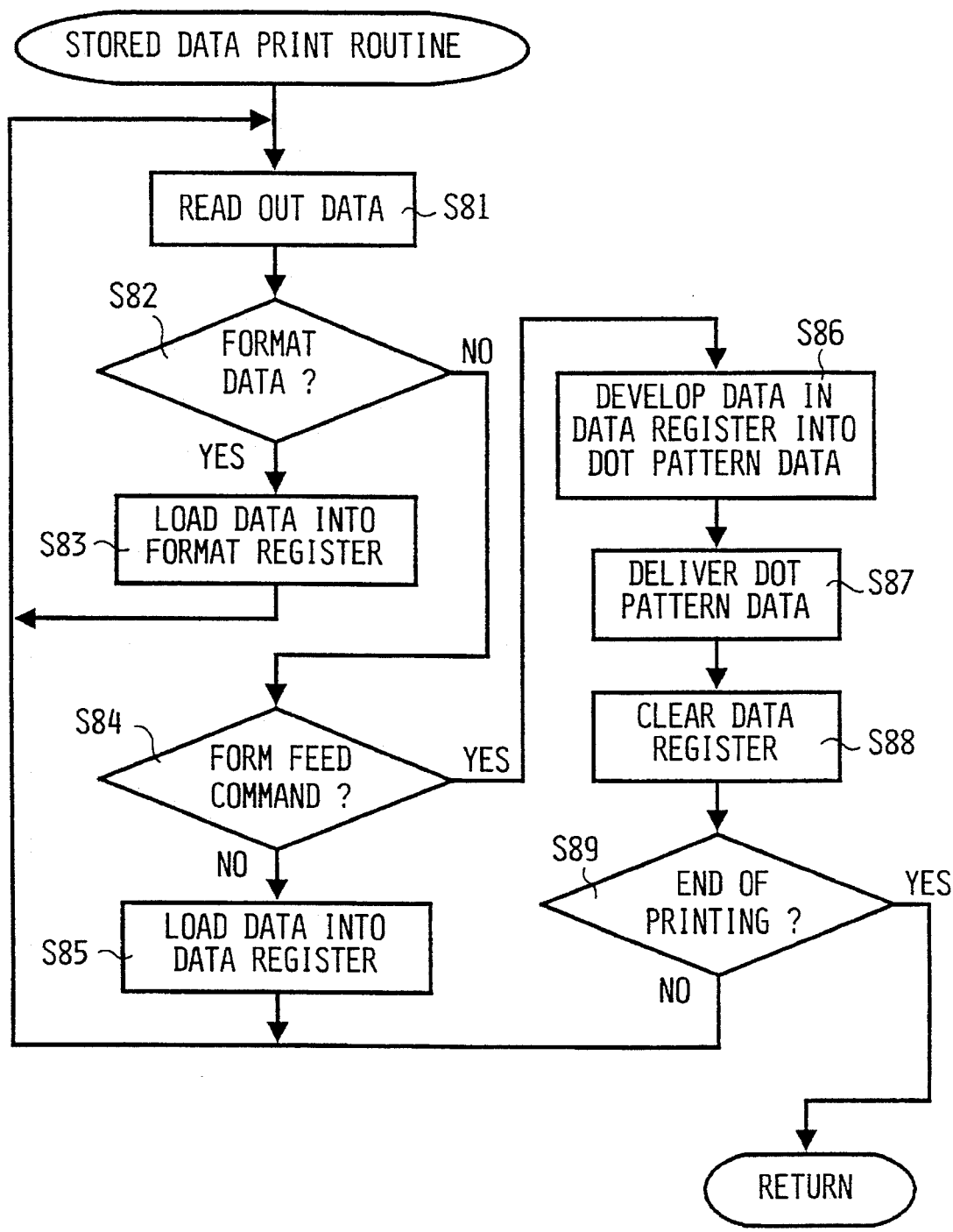
FIG. 7 is a flowchart explaining a stored data print routine.

During the print control of FIG. 2, if the operation of PRINT key is detected (S11: yes, S12, S14, S16, S18: no, S20 yes), the stored data print process for printing data stored in the non-volatile memory 24 (FIG. 7) takes place (S21). This control process is identical to that carried out in foregoing step S34, and explanation thereof is not repeated. On completion of this process, the control sequence returns to S11.

In case another key is operated instead of the STORE MODE key, PRINT MODE key, DELETE key or PRINT & STORE MODE key, a corresponding process takes place (S22), e.g., if the STORE NUMBER key set is operated (S11: yes, S12, S14, S16, S18, S20: no), a store-number is entered. Thereafter, the control sequence returns to S11.

As described above, the inventive printing apparatus allows the operator to choose at each print data reception from an external device whether the print data is to be printed and/or stored in the non-volatile memory depending on the quantity of print data, the urgency of having a print of the data and the necessity of storing the print data. Consequently the total workability and operability of the printer and external devices can be improved.

With the concurrent print-store mode being selected, the workability of both the laser printer and external devices can be improved.

The inventive printer is capable of merging print data that has been stored in the non-volatile memory 24 into received print data and printing the merged print data.

Print data is stored in the non-volatile memory 24 with a store-number data appended to it, and accordingly, each record of print data can be readily identified.

Although in the foregoing embodiment, the print data processing routine detects (in step S35) the merge command in the received data to set the merge flag GF, the flag may alternatively be set in response to the operation of a MERGE key, which is provided on the operation panel 23.

The non-volatile memory 24 may be replaced with an external storage device such as a hard disk unit or floppy disk unit.

The foregoing arrangement may be modified such that dot image data read out of the non-volatile memory 24 is loaded intact into the print buffer upon receiving dot image data.

The present invention is applicable to various printers including dot-matrix line printers having a print data receiving function.

While the embodiments disclosed herein are preferred, it will be appreciated from this teaching that various alternatives, modifications, variations or improvements therein may be made by those skilled in the art that are within the scope of the invention, which is defined by the following claims.

What is claimed is:

1. A printing apparatus comprising:

an interface circuit for receiving print data from an external data source;

printing means for printing the print data on a print medium;

a writable non-volatile memory for storing the print data;

processing means for selectively implementing a printing process for loading the print data into said printing means and a storing process for storing the print data in said non-volatile memory;

merging control means for merging print data read out of said non-volatile memory into received print data so that merged print data is printed; and data readout means for reading print data out of said non-volatile memory and loading the print data into said printing means for printing.

2. The printing apparatus according to claim 1, wherein said processing means implements the printing process and storing process simultaneously.

3. The printing apparatus according to claim 1, further including identification data storing means for storing, in said non-volatile memory, identification data associated with the print data after the print data has been stored in said non-volatile memory.

4. A printing apparatus comprising:

an interface circuit for receiving print data from an external data source;

storage means for storing said print data received from said external data source;

printing means for printing said print data on a print medium;

means for selectively setting at least one of a printing mode for printing said print data and a storing mode for storing said print data, said print mode outputting said print data to said printing means and said storing mode outputting said print data to said storage means, wherein said storage means stores other data received prior to said print data from said external data source; and merging means for merging said other data and said print data, thereby forming merged data, said merged data being at least one of printed by said printing means and stored by said storage means.

5. The printing apparatus according to claim 4, wherein said means for selectively setting comprises means for setting said printing mode and said storing mode simultaneously.

6. The printing apparatus according to claim 4, wherein said other data comprises a data indicator for identification of said other data.

7. The printing apparatus according to claim 6, wherein said print data comprises character data and format data, the printing apparatus further comprising dot pattern generating means for developing said character data into dot pattern data in accordance with said format data.

8. The printing apparatus according to claim 7, wherein said storage means comprises a writable non-volatile memory.

9. A method of operating a printing apparatus having an interface circuit for receiving print data from an external data source, the method comprising the steps of:

selectively setting at least one of a printing process for printing said print data and a storing process for storing said print data;

storing said print data received from said external data source in accordance with said setting step;

printing said print data on a print medium in accordance with said setting step;

storing other data received prior to said print data from said external data source; and merging said other data and said print data, thereby forming merged data, said merged data being at least one of printed in said printing step and stored in said storing step.

10. The method according to claim 9, wherein said setting step comprises the step of setting said printing process and said storing process simultaneously.

11. The method according to claim 9, further comprising the step of storing a data indicator for identifying said other data 12. The method according to claim 11, wherein said print data comprises character data and format data, the method further comprising the step of developing said character data into dot pattern data in accordance with said format data.

13. The method according to claim 12, wherein said storing step comprises the step of storing said print data into a writable non-volatile memory.

* * * * *